Jan. 25, 1944.   C. J. SCRANTON   2,340,084
CORN HARVESTER
Filed June 15, 1942   2 Sheets-Sheet 1
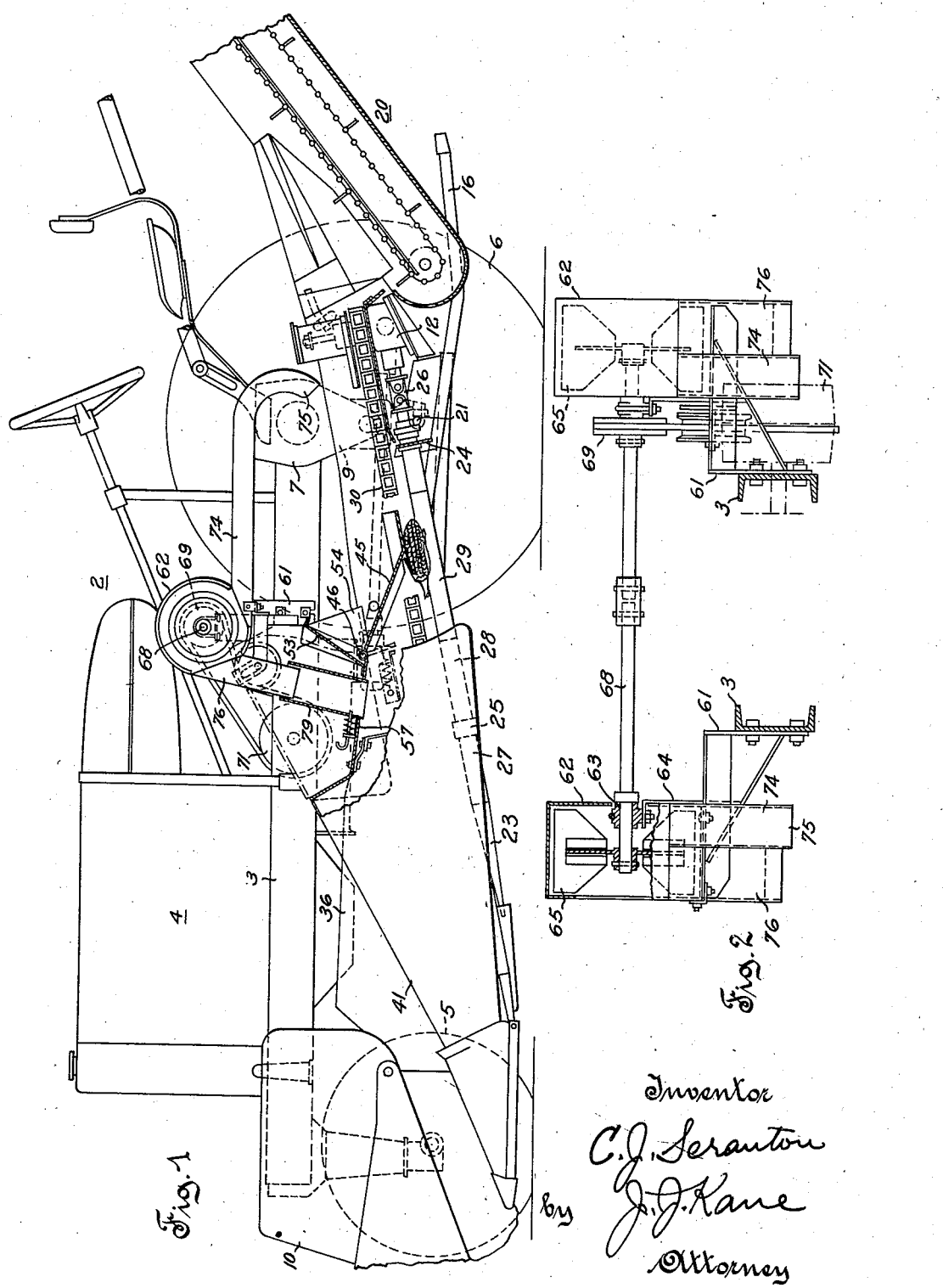

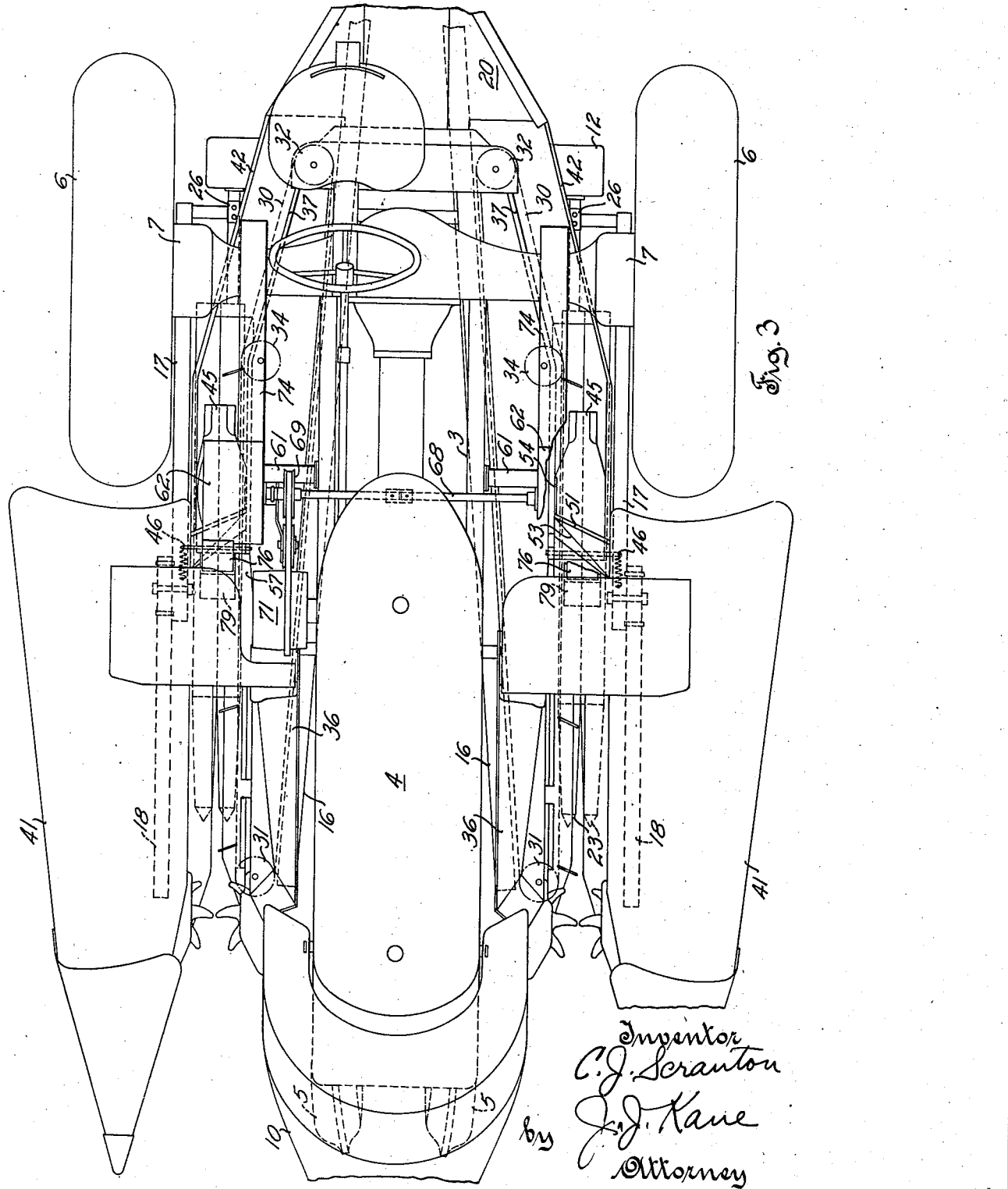

Patented Jan. 25, 1944

2,340,084

UNITED STATES PATENT OFFICE 2,340,084

CORN HARVESTER

Charles J. Scranton, La Porte, Ind., assignor to Allis-Chalmers Manufacturing Company, Milwaukee, Wis., a corporation of Delaware Application June 15, 1942, Serial No. 447,021

13 Claims. (Cl. 56—18)

This invention relates in general to corn harvesters, and it has more particular relation to corn harvesters of the type designed for mounting on a tractor and wherein the latter serves not only as a means for propelling the harvester through the field, but also as a support or carrier for the harvester.

In the operation of corn harvesters of the picker-husker type, particularly under certain conditions of the crop, there is likely to be an appreciable amount of stalk leaves torn or broken off during the snapping operation and of loose husks resulting from the husking operation which are not always passed through the rolls; and the removal of this refuse prior to reaching the point of collection of the husked corn is particularly desirable.

The present invention is concerned with the provision of suitable facilities associated with a corn harvester for removing broken stalk leaves and corn husks or like refuse, either by facilitating the passage of this material downwardly through the rolls or over the side of the rolls to ground; and these facilities preferably are of such character as provide for loosening the outer husks of the picked corn in its passage to the husking rolls, so as to permit the latter to more readily seize and draw the husks through the rolls during the husking operation.

In a preferred embodiment of the invention, use is made of an air blast from a source driven by the tractor engine, with a discharge nozzle directed toward the rolls at a point where broken stalk leaves may be disposed of and the picked corn subjected to a loosening of the outer husks prior to passage of the picked corn to the husking rolls, and a discharge nozzle directed onto the husked corn after it leaves the husking rolls, so as to dispose of loose husks and trash passing from the husking rolls.

It is an object of the present invention to provide a corn harvester of improved design embodying air blast provisions for removing trash from the harvesting rolls and conveying mechanism.

It is a further object of this invention to provide a corn harvester of improved design wherein features of the corn harvester concerned with the normal harvesting operation are utilized in connection with an air blast device, particularly for guiding and facilitating the passage of refuse material, carried by the air blast, to outside points.

It is a further object of this invention to provide an improved design of air blast device and the operative association thereof with features of a tractor-mounted corn harvester.

These and other objects and advantages are attained by the present invention, various novel features of which will be apparent from the description herein and the accompanying drawings, disclosing an embodiment of features of the invention, and will be more particularly pointed out in the annexed claims.

In the accompanying drawings:

Fig. 1 is a side view of a tractor-mounted corn harvester embodying features of the present invention, with parts broken away and other parts in section;

Fig. 2 is a rear elevation of a detail concerned with the air blast feature of the apparatus shown in Fig. 1; and Fig. 3 is a plan view of the apparatus shown in Fig. 1, with certain parts broken away.

In the embodiment of the invention illustrated in the drawings, a conventional form of tractor is indicated at 2, and it includes a supporting frame 3 carrying an engine 4, with conventional control accessories. The tractor frame is supported on a pair of front wheels 5 having their axles suitably hung from the frame, and on a pair of traction wheels 6 carried by a rear axle housing of the tractor frame. This rear axle housing is preferably of the drop type wherein the intermediate portion encloses a differential drive, driven from the engine through the usual transmission, and depending side portions 9 of the housing enclose gear connections from the differential drive to the axles of the traction wheels 6. A center divider shield 10 may be mounted on the forward end of the tractor, as indicated. A power takeoff connection from the engine is suitably connected in driving relation to the main harvester drive mounted within a housing 12 carried by the harvester frame.

The harvester frame comprises inner and outer longitudinally extending bars 16 and 17, respectively, braced by suitable cross bar connections, and auxiliary frame bars 18 detachably connected to the forward end portion of the outer frame bars 17.

The corn harvester is shown as comprising two units which are similar except as to being left and right, and each comprising cooperative picking and husking rolls mounted on a supporting frame and disposed at its own side of the tractor frame and with its essential harvesting parts disposed laterally within the tread of the adjacent traction wheels 6, and a conveying device extending rearwardly for conveying husked corn from the harvester rolls rearwardly beneath the tractor rear axle and depositing it in the forward lower end of an elevating conveyer 20 pivotally mounted on the harvester frame at the rear thereof.

The harvester frame is pivoted at a point adjacent its rear end to the depending side portions 9 of the rear axle housing, as indicated at 21, the forward end portion of the frame being suitably suspended from the tractor frame to permit desired raising and lowering by the tractor operator.

The harvester rolls, indicated at 23, are mounted in bearings carried by a rear bearing bracket 24 adjacent the rear end of the rolls and in bearings carried by a forward bearing bracket 25. The rear end of the shaft of the inner harvester roll is flexibly connected, as indicated at 26, to a suitable driving connection from the main harvester drive, and the outer harvester roll is driven through a geared connection from the inner roll.

Each harvester roll includes a forward picker section 27 forwardly of the bearing support 25, a trash removing section 28 rearwardly of the picker section and also disposed rearwardly of the bearing bracket 25, a husking section 29 rearwardly of the trash removing section, and preferably a second trash removing section rearwardly of the husking section.

A conveying chain 30 is operatively mounted on a front sprocket 31 carried by the forward end of the frame at the inner side of the rolls, and a driving sprocket 32 suitably mounted on a vertical shaft driven from the main power drive of the harvester, and with a suitably mounted guiding sprocket 34 for directing the active course of the chain over the harvester rolls.

An inner gathering shield 36 is suitably supported on the main frame at the inner side of the active course of the conveying chain, and this gathering shield has a rear end extension 37. An outer gathering shield 41 is mounted on the auxiliary frame bar 18, this outer gathering shield having a rearward extension 42. The rearward extensions 37 and 42 of the inner and outer gathering shields, respectively, cooperate to form a trough over the husking roll sections and rearwardly thereof along which husked corn is conveyed rearwardly by the conveying chain to the elevator well.

A presser plate 45 is pivotally mounted, as indicated at 46, in a removable manner, in brackets carried by the upper edge of the rear extensions 37 and 42 of the inner and outer gathering shields, respectively. The presser plate is biased to dispose the rear portion thereof in position where it engages and presses picked ears of corn onto the husking rolls. Suitable spring means are provided for biasing the rear end of the plate downwardly and for limiting such downward movement so as to avoid interference with the conveying chain.

A deflecting element is mounted at the inner edge of the outer gathering shield, this deflecting element extending inwardly from the shield and overlying the trough formed by the rear extensions 37 and 42 of the inner and outer gathering shields, respectively. The deflector element includes a warped deflecting surface 53 and a rearwardly extending deflecting surface 54 at the inner edge of the warped surface 53, the combination of deflecting surfaces being such that when air is directed against the deflecting surface, the air is deflected upwardly and outwardly across the trough to the outer side thereof. The deflecting element may be further braced through the connection of a flange portion thereon to a bracket plate 57 carried at the underside of the shield.

Brackets 61 are mounted on the frame bars 3 of the tractor, and fan casings 62 are removably mounted on these brackets. Bearings 63 are mounted on pedestal brackets removably supported on the bracket 61 or on the inner wall of the fan housing. A bladed fan rotor 65 is mounted on each end of a shaft 68 to operate within its respective fan housing. One or both end walls of each housing may be removable; and the shaft 68 is preferably in a plurality of sections detachably connected together for facility in assembling and disassembling the fan structure.

A sheave 69 is mounted on the shaft 65 and is driven by a belt from a suitably grooved power takeoff pulley 71 mounted on a transverse power takeoff shaft of the tractor.

Each fan casing 62 is provided with two discharges, an axially inner one 74 being carried rearwardly over the rear axle housing and having a downwardly and forwardly directed discharge nozzle 75 through which air is discharged forwardly along the husked ear conveying trough. The axially outer discharge 76 from the fan casing leads into and has a sliding fit in the upper end of a conduit 79 removably supported in position in the inner bracket plate 57 on the outer gathering shield, the upper end of the discharge conduit 79 passing through an opening in the roof of the gathering shield. The discharge conduit 79 is so mounted that the air blast from its lower end is directed onto the harvester rolls in advance of the husking sections thereof and over the trash roll sections.

During normal operation of the tractor-mounted harvester, the picking sections of the harvester rolls remove the ears from the stalks, and the conveying chain carries the picked ears over the trash rolls and onto the husking rolls, where the presser plate 45 forces the ears into firm engagement with the husking rolls which are effective to remove the husks from the ears and pass them downwardly through the rolls. The conveying chain carries the ears from the husking rolls and rearwardly along the trough formed by the extensions 37 and 42 of the gathering shields and a bottom plate mounted on the harvester frame.

The air blast from the forward discharge conduit 79 directed onto the trash removing sections of the rolls removes trash, such as stalk leaves, and facilitates its passage through the trash rolls, and this blast also has the effect of loosening or fluffing the outer husks of the picked ears, leaving these husks in such condition that the husking rolls will more readily seize and remove the husks. The air blast from the rear discharge nozzle 75 carries forwardly through the trough any loose husks therein and discharges any such trash along the upper face of the presser plate 45 and against the deflecting shield 53, 54 which guides and discharges such trash outwardly and downwardly outside the trough.

It should be understood that the invention claimed is not limited to the exact details of design and construction described herein, for obvious modifications within the scope of the annexed claims will be apparent to those skilled in the art.

It is claimed and desired to secure by Letters Patent:

1. In a power operated corn harvester, cooperative harvesting rolls, each including alined picking and husking sections, air blast producing means having a discharge nozzle directing a blast of air downwardly onto said rolls at a point adjacent the rear end of said cooperative picking sections and a discharge nozzle directing a separate blast of air onto and forwardly along said rolls at the rear part of said husking sections, and a deflector device disposed above said husking sections for guiding refuse effects of said latter blast away from said husking sections and outwardly and downwardly onto the ground.

2. In a power operated corn harvester, cooperative harvesting rolls including alined picking and husking sections, and a trash removing section intermediate said picking and husking sections, air blast producing means having a discharge nozzle directing a blast of air downwardly onto the trash removing sections of said rolls and a discharge nozzle directing a separate blast of air onto and forwardly along said rolls at the rear of said husking sections, and a deflector device deposed above said husking sections to guide refuse effects of said latter blast away from said husking sections and outwardly and downwardly onto the ground.

3. In a power operated corn harvester, cooperative harvesting rolls including alined picking and husking sections, a single blower fan having two discharge conduits one directing a blast of air downwardly onto said rolls at the rear of said picking sections and forwardly of said husking sections and the other conduit directing a separate blast of air downwardly and forwardly along said rolls at the rear part of said husking sections, and a deflector device for guiding refuse effects of said latter blast upwardly over said husking sections and outwardly and downwardly onto the ground.

4. In a power operated corn harvester, cooperative harvesting rolls including husking sections, a conveyer trough into which ears of corn are discharged from said husking sections and along which they travel to a discharge point, a yieldable presser plate disposed in position over the husking sections of said rolls and operative to yieldingly press ears onto said husking sections, air blast producing means having a discharge nozzle directing a blast of air forwardly along said trough and over said rolls at the rear portion of the husking sections thereof, and a deflector disposed over the forward end of said presser plate and having guiding surfaces serving with the upper surface of said presser plate to guide refuse effects of said latter blast onto the ground.

5. In a power operated corn harvester, cooperative harvesting rolls including alined picking and husking sections and a trash removing section intermediate said picking and husking sections, a conveyer trough into which ears of corn are discharged from said husking sections and along which they travel to a discharge point, a yieldable presser plate disposed in position over the husking sections of said rolls and operative to yieldingly press ears onto said husking sections, air blast producing means having a discharge nozzle directing a blast of air onto said trash removing sections of said rolls and a separate discharge nozzle for directing a blast of air forwardly along said trough and over said husking roll sections, and a deflector disposed over the forward end of said presser plate and having upwardly and outwardly guiding surfaces serving in conjunction with the upper surface of said presser plate to guide refuse effects of said latter blast onto the ground.

6. In a tractor-mounted corn harvester, a supporting frame detachably mounted on said tractor, cooperative harvesting rolls including husking roll sections, a conveying trough extending rearwardly beyond said husking roll sections, a yielding presser plate mounted on said frame and disposed over said husking roll sections between the side walls of said trough and biased to press picked ears onto said husking roll sections, a deflector having it lower edge adjacent the upper part of said presser plate and having outwardly and downwardly extending deflecting portions, and air blast means for producing a blast of air traveling forwardly through said trough and over the rear part of said rolls, the upper surface of said presser plate and said deflector serving to guide and remove outwardly refuse effects of said air blast.

7. In a tractor-mounted corn harvester, a supporting frame detachably mounted on said tractor, cooperative harvesting rolls having husking sections and mounted on said frame, an inner gathering shield mounted on said frame at the inner side of said rolls, an outer gathering shield mounted on said frame at the outer side of said rolls, the rear portions of said gathering shields forming a conveying trough extending rearwardly beyond said husking sections; a yielding presser plate disposed between the side walls of said trough and biased to yieldingly press ears onto said husking roll sections, air blast means for producing a blast of air traveling forwardly through said trough and along the upper surface of said presser plate and for producing a separate blast of air onto said rolls forwardly of said husking sections, a deflector mounted on the upper portion of said outer gathering shield with its inner lower edge adjacent the upper part of said presser plate and having outwardly and downwardly extending deflecting portions for guiding and discharging refuse effects of said first mentioned blast of air.

8. In a tractor mounted corn harvester, a supporting frame detachably mounted on said tractor, cooperative harvesting rolls having alined picking and husking sections and mounted on said frame, an inner gathering shield mounted on said frame at the inner side of said rolls, an outer gathering shield mounted on said frame at the outer side of said rolls, an air blast device driven from a power takeoff connection on said tractor and having a discharge for producing a generally downwardly directed blast of air, a discharge conduit supported by said outer gathering shield and communicating at its upper end with said air blast discharge and having its lower end positioned to direct the blast of air onto said rolls rearwardly of said picker sections and forwardly of said husking sections.

9. In a tractor-mounted corn harvester, a supporting frame detachably mounted on said tractor, a pair of cooperative harvesting rolls mounted on said frame at each side of said tractor, each of said rolls including alined picking and husking sections with a trash removing section interposed between said picking and husking sections, a blower fan assembly mounted on said tractor-harvester assembly and comprising separate fan casings disposed at opposite sides of said tractor and each adjacent a pair of said harvesting rolls, a rotor within each of said casings, driving means for said fan rotors, each casing having a plurality of discharge nozzles, a conduit connection from one of said nozzles to a point over and discharging air onto said trash removing sections of the adjacent pair of said rolls forwardly of said husking roll sections, a conduit connection from another discharge nozzle of said casing disposed to direct a blast of air onto said pair of rolls rearwardly of and forwardly over said husking sections, and deflecting means disposed over said husking sections for deflecting refuse effects of said latter air blast over the side of said rolls and onto the ground.

10. In a tractor-mounted corn harvester, a supporting frame detachably mounted on said tractor, cooperative harvesting rolls including cooperative picker and husking sections, and a trash removing section intermediate said picker and husking sections disposed at each side of said tractor, an inner gathering shield mounted on said frame at the inner side of the rolls at each side of the tractor, an outer gathering shield detachably mounted on said frame at the outer side of the rolls at each side of the tractor, the rear portions of said gathering shields forming conveying troughs over the rolls at each side of the tractor and extending rearwardly beyond the husking sections of said rolls, a blower fan assembly mounted on said tractor-harvester assembly and comprising a plurality of casings, a fan rotor mounted in bearings in each of said casings, a common driving shaft for said fan rotors, each casing being provided with a plurality of axially spaced discharge nozzles, a conduit connection from the axially inner one of said discharge nozzles to a point in said conveyer trough rearwardly of said husking sections, and a conduit connection from the other of said discharge nozzles to a point over said rolls and rearwardly of said picker sections and forwardly of said husking sections.

11. In a power operated corn harvester, cooperative harvesting rolls including alined picking and husking sections and trash removing sections rearwardly of said picking sections and forwardly of said husking sections, and air blast producing means having a discharge nozzle directing a blast of air downwardly onto said trash removing sections to assist in forcing loose leaves through said trash removing sections and to loosen outer husks on ears moving rearwardly along said latter sections prior to said ears passing onto said husking sections.

12. In combination with a tractor comprising an engine carried by a supporting frame at the forward portion thereof, a corn harvester including a forwardly extending supporting frame pivotally mounted on the tractor and carrying a pair of cooperative harvesting rolls extending forwardly along each side of the tractor frame, a blower fan removably mounted on said tractor frame at each side thereof at the rear of the tractor engine, the rotors of said fans being carried by axially alined shaft sections, a detachable driving connection between said shaft sections, a power drive from said engine to one of said shaft sections, and each of said fans having a discharge conduit for directing a blast of air onto the adjacent pair of harvesting rolls for removing trash therefrom.

13. In combination with a tractor comprising an engine carried by a supporting frame at the forward portion thereof and an operator's seat positioned at the rear portion of the tractor frame, a corn harvester including a forwardly extending frame pivotally mounted on the tractor and carrying a pair of cooperative harvesting rolls extending along one side of the tractor frame, and a blower fan removably mounted on said tractor frame at the rear of the engine and forwardly of the operator's position on the tractor, said fan being provided with a discharge conduit having its outlet positioned over said harvesting rolls for directing a blast of air onto said rolls for removing trash therefrom.

CHARLES J. SCRANTON.